United States Patent
Richardson et al.

(10) Patent No.: US 11,236,845 B2
(45) Date of Patent: *Feb. 1, 2022

(54) VALVE TRIM APPARATUS HAVING MULTIPLE FLUID FLOW CONTROL MEMBERS

(71) Applicant: Fisher Controls International LLC, Marshalltown, IA (US)

(72) Inventors: Jonathan Wesley Richardson, Marshalltown, IA (US); Jesse Creighton Doyle, Lincoln, NE (US)

(73) Assignee: Fisher Controls International LLC, Marshalltown, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/891,988

(22) Filed: Jun. 3, 2020

(65) Prior Publication Data
US 2020/0362990 A1    Nov. 19, 2020

Related U.S. Application Data

(63) Continuation of application No. 14/705,549, filed on May 6, 2015, now Pat. No. 10,690,263.

(51) Int. Cl.
*F16K 47/04* (2006.01)
*F16K 1/44* (2006.01)
(Continued)

(52) U.S. Cl.
CPC .............. *F16K 47/04* (2013.01); *F16K 1/443* (2013.01); *F16K 31/122* (2013.01); *F16K 47/08* (2013.01)

(58) Field of Classification Search
CPC .......... F16K 47/04; F16K 47/08; F16K 1/443; F16K 31/122; F16K 1/526; F16K 11/10
See application file for complete search history.

(56) References Cited

U.S. PATENT DOCUMENTS

| | | | |
|---|---|---|---|
| 2,180,188 A | 11/1939 | Ashworth | F16K 39/024 137/630.14 |
| 2,904,074 A | 9/1959 | Towler | B30B 15/186 137/614.17 |

(Continued)

FOREIGN PATENT DOCUMENTS

| | | |
|---|---|---|
| CN | 203272806 | 11/2013 |
| DE | 2716328 | 11/1977 |
| EP | 0726413 | 8/1996 |

OTHER PUBLICATIONS

International Searching Authority, "International Search Report," issued in connection with International Patent Application No. PCT/US2016/031096, dated Jul. 29, 2016, 5 pages.

(Continued)

*Primary Examiner* — Michael R Reid
(74) *Attorney, Agent, or Firm* — Hanley, Flight & Zimmerman, LLC

(57) ABSTRACT

Valve trim apparatus having multiple fluid flow control members are disclosed herein. An example valve trim apparatus includes a primary valve seat and a first flow control member having a cavity and a first seating surface. The first flow control member is movable relative to the primary valve seat to control fluid flow between an inlet and an outlet of the fluid valve. A second flow control member is disposed within the cavity. The second flow control member is slidably coupled relative to the first flow control member. A secondary valve seat is coupled to the first flow control member. The second flow control member is to move relative to the secondary valve seat to throttle a fluid flow across the secondary valve seat.

21 Claims, 6 Drawing Sheets

(51) Int. Cl.
*F16K 47/08* (2006.01)
*F16K 31/122* (2006.01)

(56) References Cited

U.S. PATENT DOCUMENTS

| | | | | |
|---|---|---|---|---|
| 3,773,085 | A | 11/1973 | Caldwell, Jr. | F16K 47/04 137/630.15 |
| 3,881,459 | A | 5/1975 | Gaetcke | F01L 1/28 123/188.1 |
| 3,960,358 | A | 6/1976 | Vollmer | G05D 16/0658 137/505.18 |
| 3,971,415 | A * | 7/1976 | Foller | F16K 47/08 137/630.19 |
| 4,315,526 | A | 2/1982 | Ohtomo | F01D 17/145 137/630.14 |
| 5,172,722 | A | 12/1992 | Nishimura | F16K 39/024 137/599.16 |
| 5,339,857 | A | 8/1994 | Scallan | F16K 31/383 251/38 |
| 5,564,674 | A | 10/1996 | Kalin | F16K 31/408 251/282 |
| 6,394,135 | B2 | 5/2002 | Erickson | F16K 39/04 137/625.38 |
| 7,073,532 | B2 | 7/2006 | Bowe | F16K 1/123 137/625.33 |
| 7,383,859 | B2 | 6/2008 | Takahashi | F16K 1/36 137/625.33 |
| 7,832,426 | B2 | 11/2010 | Wears | F16K 11/044 137/625.38 |
| 10,690,263 | B2 * | 6/2020 | Richardson | F16K 47/08 |
| 2016/0327184 | A1 | 11/2016 | Richardson et al. | |

OTHER PUBLICATIONS

International Searching Authority, "Written Opinion," issued in connection with International Patent Application No. PCT/US2016/031096, dated Jul. 29, 2016, 6 pages.
Emerson Process Management, "Fisher 461 Increased Outlet Angle Sweep-Flo Valve," Instruction Manual, Nov. 2013, 20 pages.
United States Patent and Trademark Office, "Non-Final Office Action," issued in connection with U.S. Appl. No. 14/705,549, dated May 13, 2016, 7 pages.
United States Patent and Trademark Office, "Requirement for Restriction and/or Election," issued in connection with U.S. Appl. No. 14/705,549, dated Sep. 21, 2016, 7 pages.
United States Patent and Trademark Office, "Final Office Action" issued in connection with U.S. Appl. No. 14/705,549, dated Feb. 2, 2017, 6 pages.
United States Patent and Trademark Office, "Examiner's Answer," issued in connection with U.S. Appl. No. 14/705,549, dated Oct. 30, 2018, 9 pages.
United States Patent and Trademark Office, "Notice of Panel Decision," issued in connection with U.S. Appl. No. 14/705,549, dated May 26, 2017, 2 pages.
United States Patent and Trademark Office, "Requirement for Restriction and/or Election," issued in connection with U.S. Appl. No. 14/705,549, dated Jun. 19, 2017, 6 pages.
United States Patent and Trademark Office, "Non-Final Office Action," issued in connection with U.S. Appl. No. 14/705,549, dated Aug. 29, 2017, 8 pages.
United States Patent and Trademark Office, "Final Office Action," issued in connection with U.S. Appl. No. 14/705,549, dated Feb. 15, 2018, 9 pages.
United States Patent and Trademark Office, "Decision on Appeal," issued in connection with U.S. Appl. No. 14/705,549, dated Nov. 19, 2019, 9 pages.
United States Patent and Trademark Office, "Notice of Allowance and Fee(s) Due," issued in connection with U.S. Appl. No. 14/705,549, dated Feb. 20, 2020, 6 pages.
Patent Cooperation Treaty, "Written Opinion," issued in connection with International Patent Application No. PCT/US2016/031096, dated Jul. 29, 2016, 6 pages.
Patent Cooperation Treaty, "International Search Report," issued in connection with International Patent Application No. PCT/US2016/031096, dated Jul. 29, 2016, 5 pages.

* cited by examiner

VALVE TRIM APPARATUS HAVING MULTIPLE FLUID FLOW CONTROL MEMBERS

RELATED APPLICATION

This patent arises from a continuation of U.S. patent application Ser. No. 14/705,549, entitled "VALVE TRIM APPARATUS HAVING MULTIPLE FLUID FLOW CONTROL MEMBERS", filed on May 6, 2015, and which is hereby incorporated herein by reference in its entirety.

FIELD OF THE DISCLOSURE

This disclosure relates generally to control valves and, more particularly, to trim apparatus having multiple fluid flow control members.

BACKGROUND

Control valves are often used in process control plants or systems to control the flow of process fluids. In some instances such as power generation or petroleum refining applications, process conditions produce elevated levels of noise (e.g., aerodynamic noise) as the process fluid flows through a process system. To control and/or abate noise (and control other fluid flow characteristics through a passageway of a valve), control valves typically include a valve trim assembly or apparatus. However, for effective noise abatement and/or control, known valve trim apparatus are often employed only with valves configured in flow-up configurations. In particular, noise abatement valve trim apparatus employ apertures that jet or spray a high pressure fluid flow into a plurality of flow passageways.

SUMMARY

In one example, a valve trim apparatus includes example valve trim apparatus includes a primary valve seat and a first flow control member having a cavity and a first seating surface. The first flow control member is movable relative to the primary valve seat to control fluid flow between an inlet and an outlet of the fluid valve. A second flow control member is disposed within the cavity. The second flow control member is slidably coupled relative to the first flow control member. A secondary valve seat is coupled to the first flow control member. The second flow control member is to move relative to the secondary valve seat to throttle a fluid flow across the secondary valve seat.

In one example, a valve trim apparatus includes example valve trim apparatus includes a primary valve seat and a first flow control member having a cavity and a first seating surface. The first flow control member is movable relative to the primary valve seat to control fluid flow between an inlet and an outlet of the fluid valve. A second flow control member is disposed within the cavity. The second flow control member is slidably coupled relative to the first flow control member. A secondary valve seat is coupled to the first flow control member. The second flow control member is to move relative to the secondary valve seat to throttle a fluid flow across the secondary valve seat.

In another example, a valve trim apparatus includes first means for defining a first sealing surface to be positioned within a passageway of a valve body between an inlet and an outlet. The apparatus includes first means for controlling fluid flow through the passageway of the valve body between the inlet and the outlet, the first means for controlling fluid flow defining means for seating for providing a fluid flow shut-off to restrict flow through the passageway. The apparatus includes a second means for defining a second sealing surface disposed in a cavity defined by the first means for controlling fluid flow. The apparatus includes second means for controlling fluid flow through the passageway, the second means for controlling fluid flow positioned in the cavity of the first means for controlling, the second means for controlling fluid flow slidably coupled to the first means for controlling fluid flow to throttle a fluid to flow through the passageway of the valve body, the second means for controlling to move along cavity of the first means for controlling between a first position restrict fluid flow through the passageway and a second position to allow fluid flow through the passageway.

In another example, a valve trim apparatus includes first means for defining a first sealing surface to be positioned within a passageway of a valve body between an inlet and an outlet. A first means for controlling fluid flow through the passageway of the valve body is provided between the inlet and the outlet. The first means for controlling fluid flow defines a means for seating for providing a fluid flow shut-off and a means for attenuating noise produced by a fluid to flow through the passageway. A second means for defining a second sealing surface is disposed in a cavity defined by the first means for controlling fluid flow. A second means for controlling fluid flow through the passageway is position in the cavity of the first means for controlling. The second means for controlling fluid flow is slidably coupled to the first means for controlling fluid flow to throttle a fluid to flow through the passageway of the valve body. The second means for controlling is to move along the cavity of the first means for controlling between a first position to prevent fluid flow across the means for attenuating noise and a second position to allow fluid flow across the means for attenuating noise.

DETAILED DESCRIPTION

Figure 1:
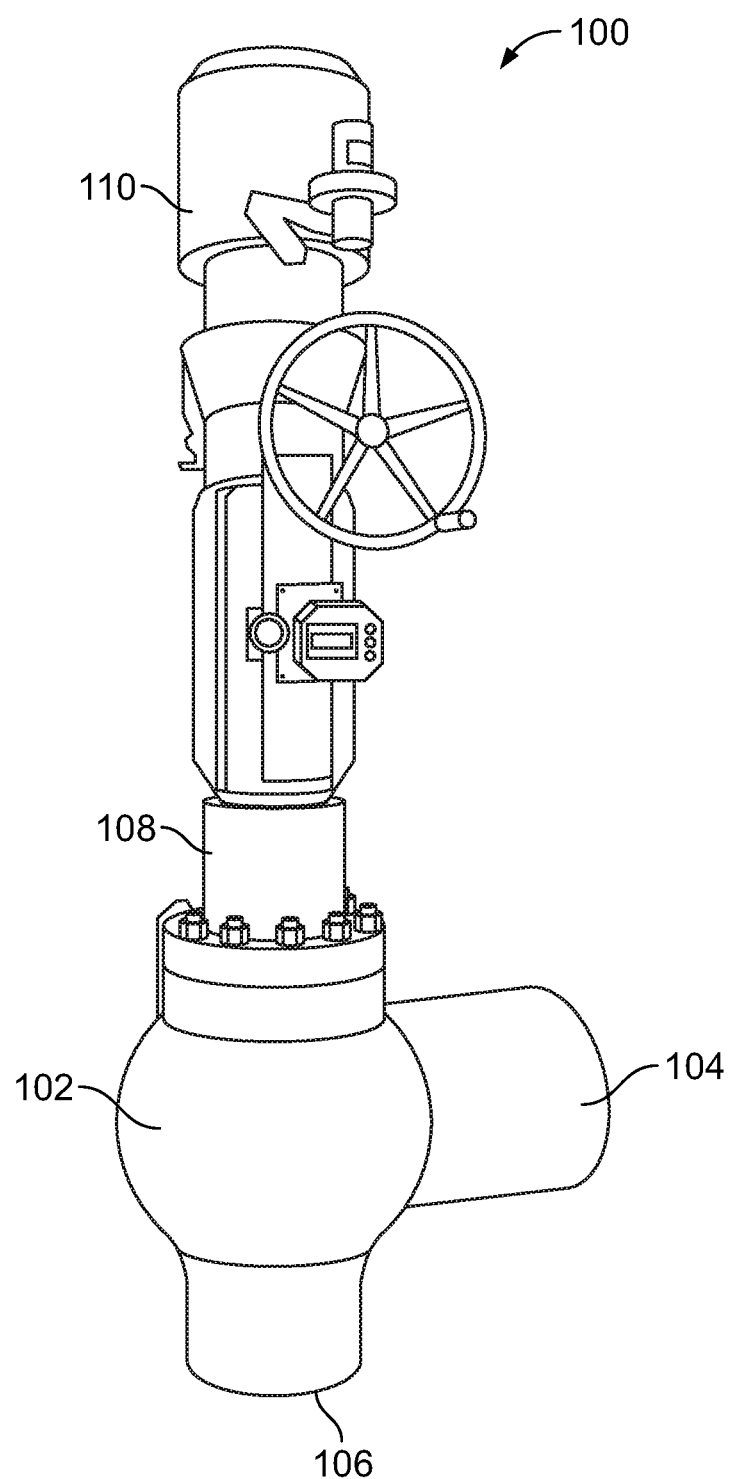
FIG. 1 illustrates an example control valve implemented with an example valve trim apparatus in accordance with the teachings disclosed herein.

Example valve trim apparatus disclosed herein may be used to reduce noise and/or pressure generated by a process fluid (e.g., a gas or liquid) flowing through an orifice and/or a passageway of a control valve (e.g., a control valve having a flow-down configuration). Further, the example valve trim apparatus described herein enable a single valve to control a throttling function separately from a shut-off function. For example, a first flow control member can move relative to a first orifice to provide a first fluid flow characteristic (e.g., a pressure reducing characteristic) through a passageway of the fluid valve and a second flow control member can move relative to a second orifice to provide a second fluid flow characteristic (e.g., noise abatement characteristic) through the passageway. Additionally, by separating the two functions, possible damage or material wear to the valve trim apparatus due the pressure drop across the valve trim apparatus is significantly reduced, thereby increasing the operational life of the valve trim apparatus.

To separate the shut-off and throttling functions, the example valve trim apparatus employs multiple flow control members. For example, a valve trim apparatus disclosed herein may include a first flow control member and a second flow control member. In particular, the first and second flow control members disclosed herein may be movable or controlled in stages to control fluid flow through a fluid flow passageway of a valve. For example, the first flow control member may be moved to an open position to equalize and/or reduce a pressure differential across the second flow control member prior to moving the second flow control member to an open position to enable a substantial reduction of breakout force compared to known fluid valves. More specifically, the first flow control member disclosed herein may move together with the second flow control member along a first portion of a stroke length of an actuator (e.g., as the first flow control member moves to an open position) and the second flow control member moves relative to the first flow control member along a second portion of the stroke length of the actuator (e.g., as the second flow control member moves to the open position). In some examples, the second flow control member may be slidably and/or telescopically coupled relative to the first flow control member. In some examples, the second flow control member can move independently relative to the first flow control member along at least a portion of a stroke length of an actuator. In some examples, the first flow control member follows movement of the second flow control member as the second flow control member is actuated by the actuator along at least a portion of a stroke length travel of the actuator. In some examples, the first flow control member is pressure assisted from a pressurized process fluid upstream from the first flow control member to move between the first or open position and a second or closed position.

As a result, the example valve trim apparatus disclosed herein enables the first flow control member to move between an open position and a closed position (e.g., move relative to a first valve seat) while the second flow member remains in a closed position (e.g., sealingly engaged with a second valve seat different than the first valve seat). Likewise, the second flow control member can move between an open position and a closed position (e.g., move relative to the second valve seat) while the first flow control member is in the open position relative to the first valve seat.

The example first flow control member and/or the second flow control member may include features or structures (e.g., apertures) to attenuate or abate noise through a passageway of a control valve due to pressure changes and/or velocity of a process fluid flowing through the passageway. In some examples, the valve trim apparatus disclosed herein include a cage or cylinder having openings and/or other features or structures to control noise, velocity and/or other characteristics of a process fluid. More specifically, the first and second flow control members may be movably coupled relative to an inner surface of the cage. In some examples, the cage is not provided and the features and/or characteristics provided by the cage may be provided adjacent an end of the first flow control member opposite an end having the noise attenuation and/or abatement features.

In some examples, the example valve trim apparatus disclosed herein provide noise attenuation and/or abatement for push-to-open, flow-down control valves. Specifically, the example valve trim apparatus disclosed herein jet or spray high pressure process fluid flowing from an inlet positioned above an outlet of a fluid valve. Additionally or alternatively, at least some example valve trim apparatus disclosed herein is positioned in an outlet portion of an orifice of the fluid flow passageway. As a result, a shorter distance between the inlet side of the orifice and the actuator is provided, thereby providing an overall length of the example valve trim apparatus having a significantly shorter length than a length of typical valve trim apparatus employed that are only positioned on an inlet side of an orifice. For example, an example valve trim apparatus disclosed herein has a first portion positioned in a fluid flow passageway on an inlet side an orifice and/or the fluid flow passageway and a second portion positioned in the fluid flow passageway on an outlet side of an orifice and/or the fluid flow passageway. In other words, a valve trim apparatus disclosed herein overlaps both sides of an orifice of a fluid flow passageway.

FIG. 1 illustrates a control valve assembly 100 (e.g., a flow down angle-style control valve) constructed in accordance with the teachings disclosed herein that may be employed in high pressure differential applications. Referring to FIG. 1, the example control valve assembly 100 includes a valve 102 that defines a side port or an inlet 104 and a bottom port or an outlet 106. In this example, the inlet 104 is turned at an angle (e.g., a 90 degree angle) relative to the outlet 106. A bonnet 108 couples the valve 102 to an actuator 110 (e.g., a pneumatic actuator, an electric actuator, a hydraulic actuator, etc.).

Figure 2:
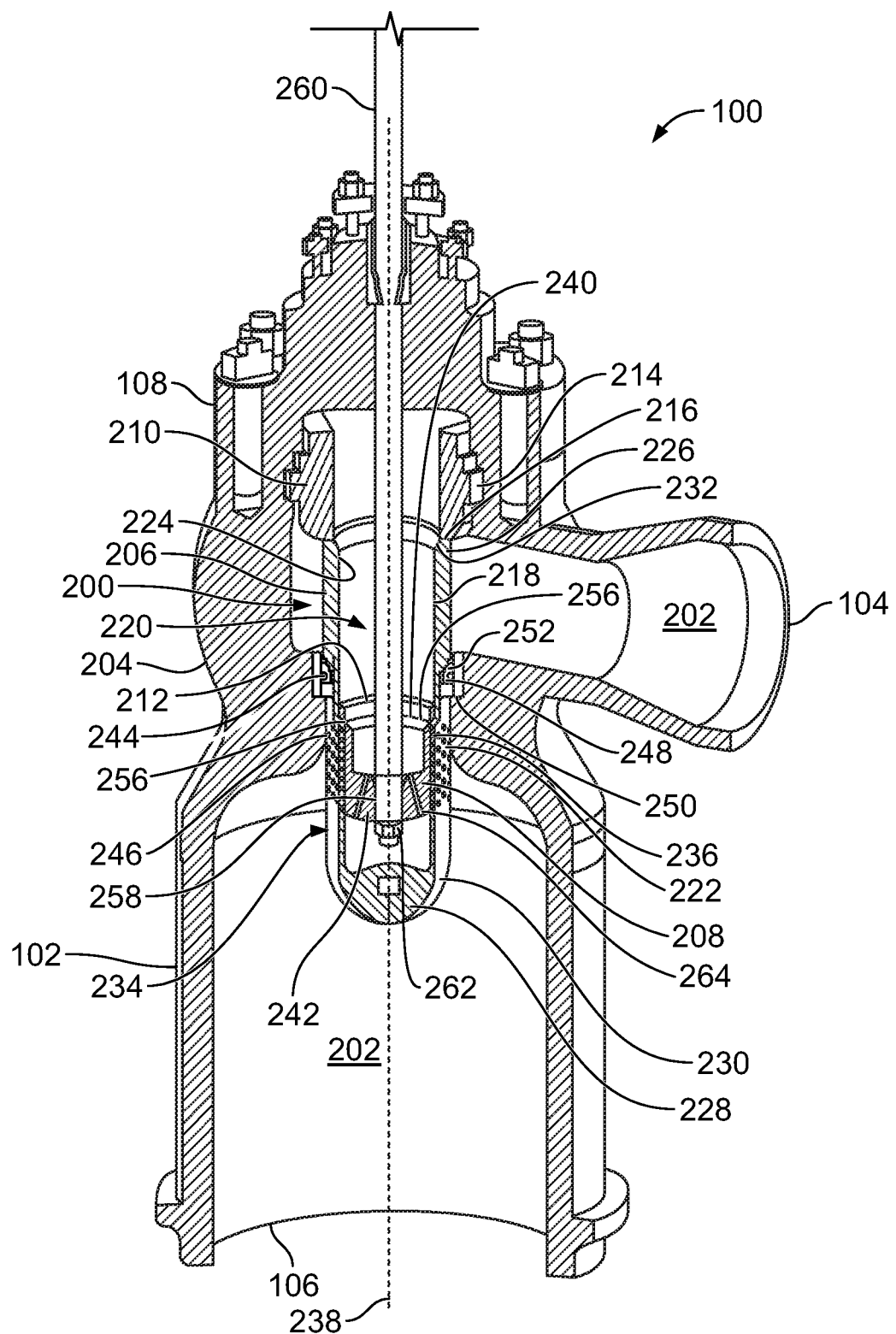
FIG. 2 illustrates a cut-away view of the example control valve assembly of FIG. 1.

FIG. 2 illustrates a partial cut-away view of the example control valve assembly 100 of FIG. 1. The example valve 102 of the illustrated example includes a valve trim apparatus 200 constructed in accordance with the teachings disclosed herein. The valve trim apparatus 200 of the illustrated example is positioned within an opening or passageway 202 defined by a valve body 204 of the valve 102 to control fluid flow between the inlet 104 and the outlet 106. Additionally, the valve 102 of the illustrated example is configured as a flow-down valve ad, thus, process fluid from the inlet 104 flows through the passageway 202 in a downward direction or flow path and to the outlet 106. Thus, the valve trim apparatus 200 of the illustrated example is configured for use as a flow-down control valve.

In high differential pressure applications, fluid (e.g., a liquid, gas, steam, etc.) at the inlet 104 of the valve 102 typically has a relatively high pressure that is reduced to a substantially lower pressure at the outlet 106 of the valve 102. The relatively high pressure differential across the valve 102 significantly increases the velocity of the fluid flowing through the passageway 202 of the valve body 204. The increased velocity can cause the fluid flowing through the valve 102 to produce unwanted or undesired elevated levels of noise (e.g., aerodynamic noise). The example valve trim apparatus 102 of the illustrated example includes features or structures to control, abate, attenuate and/or reduce noise that may be caused by high pressure and/or high velocity process fluid flowing between the inlet 104 and the outlet 106.

The valve trim apparatus 200 of the illustrated example includes a primary or first flow control member 206, a secondary or second flow control member 208, a primary valve seat 210 and a secondary valve seat 212. The first flow control member 206, the second flow control member 208, the primary valve seat 210 and/or the secondary valve seat 212 may be composed of a metallic material such as, for example, stainless steel, plastic material, a rubber material and/or any other suitable material(s) or combination of materials.

The primary valve seat 210 is positioned and/or captured (e.g., hung) between the bonnet 108 and the valve body 204. In particular, the primary valve seat 210 includes a retaining ring 214 and a primary sealing surface 216. The retaining ring 214 is captured or clamped between the bonnet 108 and the valve body 204 such that the primary sealing surface 216 is suspended or hung within the passageway 202.

The first flow control member 206 moves relative to the primary valve seat 210 to provide an on/off function or shut-off control to prevent or restrict fluid flow though the passageway 202 when the valve 102 is in a closed position (e.g., a position as shown in FIG. 2). The second flow control member 208 moves relative to the secondary valve seat 212 to throttle fluid flow through the passageway 202 between the inlet 104 and the outlet 106. In some examples, the first flow control member 206 and the primary valve seat 210 are configured to provide a substantially tight shut-off. (e.g., Class V shut-off classification provided by ANSI/FCI 70-2 1976(R1982).

The first flow control member 206 of the illustrated example includes a body 218 (e.g., an elongated, cylindrically-shaped body) defining a bore or a cavity 220 and an outer surface 222. The body 218 includes an opening 224 adjacent a first end 226 of the body 218 and an end or cap 228 (e.g., a curved or arcuate end) adjacent a second end 230 of the body 218 opposite the first end 226. Thus, the first flow control member 206 of the illustrated example has a U-shaped profile or cross-section. The first end 226 of the first flow control member 206 includes a primary seating surface 232 (e.g., a metallic seating surface) that sealingly engages the primary sealing surface 216 (e.g., a metallic sealing surface) of the primary valve seat 210 to provide a relatively tight shut-off.

In the illustrated example, the second end 230 of the first flow control member 206 includes a noise attenuating feature 234 along at least a length of the body 218. The noise attenuating feature 234 of the illustrated example includes a plurality of apertures 236 extending through the body 218 between the cavity 220 and the outer surface 222. The apertures 236 of the first flow control member 206 provide a plurality of flow passages that jet or spray a fluid flowing between the inlet 104 and the outlet 106 to reduce amount of energy in a flow stream that is converted to noise and/or shift the frequency of generated noise to levels beyond an audible range. Each of the apertures 236 of the illustrated example defines a longitudinal axis that is non-parallel (e.g., substantially perpendicular) relative to a longitudinal axis 238 of the valve 102 (e.g., a vertical longitudinal axis in the orientation of FIG. 2). Further, the apertures 236 of the illustrated example have a substantially straight profile or shape. However, in other examples, the apertures 236 may have a curved or arcuate profile, an angled profile, a tapered profile and/or any other shape or profile.

The first end 226 of the first flow control member 206 of the illustrated example is substantially solid (i.e., does not include apertures or openings extending through the body 218). However, in some examples, the first end 226 of the body may include openings, slots, angled slots, and/or any other suitable apertures or openings (e.g., similar to the apertures 236) to affect a characteristic of a process fluid flowing through the passageway 202 between the inlet 104 and the outlet 106. Although not shown, in some examples, the valve trim apparatus 200 of the illustrated example may include a cage positioned between the bonnet 108 and/or the primary valve seat 210 and the valve body 204 such that the first flow control member 206 moves and/or slides within the cage. The cage may include apertures along a length of the cage to affect a characteristic of a process fluid flowing through the passageway 202 between the inlet 104 and the outlet 106. When the valve trim apparatus 200 employs a cage, the outer surface 222 of the first end 226 of the first flow control member 206 may move relative to the apertures of the cage to control fluid flow through the passageway 202.

The first flow control member 206 of the illustrated example includes a longitudinal axis that is substantially aligned (e.g., coaxially aligned) with the longitudinal axis 238 of the valve 102. When disposed in the passageway 202, at least a portion of the second end 230 of the first flow control member 206 extends into the passageway 202 of the valve body 204 in a direction toward the outlet 106 and away from a first side 240 of the second flow control member 208 (e.g., an outlet side of the secondary valve seat 212). Similarly, at least a portion of the first end 226 of the first flow control member 206 extends into the passageway 202 of the valve body 204 in a direction toward the bonnet 108 and/or the primary valve seat 210 and away from a second side 242 of the second flow control member 208 (e.g., an inlet side of the secondary valve seat 212). Thus, the first end 226 of the first flow control member 206 moves relative to the primary valve seat 210 to control fluid flow in the passageway 202 relative to the inlet side of the secondary valve seat 212 (e.g., upstream from the second flow control member 208) and the second end 230 of the first flow control member 206 varies a fluid flow characteristic (e.g., noise) of the process fluid downstream from the outlet side of the secondary valve seat 212 (e.g., downstream from the second flow control member 208).

The outer surface 222 of the first flow control member 206 includes a seal 244 (e.g., a dynamic seal) to restrict or prevent fluid leakage between the outer surface 222 of the first flow control member 206 and an inner surface or opening 246 of the valve body 204. Specifically, the outer surface 222 of the first flow control member 206 and/or the seal 244 define a shoulder 248 that engages a shoulder 250 of the valve body 204. The first flow control member 206 of the illustrated example is coupled to the valve body 204 via a retainer 252 (e.g., a retaining ring). The retainer 252 enables the first flow control member 206 to move or slide within the passageway 202 relative to the opening 246 of the valve body 204.

The second flow control member 208 is slidably coupled or received within the cavity 220 of the first flow control member 206 via the opening 224. More specifically, the second flow control member 208 of the illustrated example has a longitudinal axis that is substantially aligned and/or parallel (e.g., coaxial) relative to the longitudinal axis 238 of the valve 102. Additionally, the secondary valve seat 212 of the illustrated example is received within the cavity 220 via the opening 224 and is removably coupled to the cavity 220 of the first flow control member 206. For example, the secondary valve seat 212 of the illustrated example is threaded within the cavity 220 of the first flow control member 206. However, in some examples, the secondary valve seat 212 is coupled to the first flow control member 206 via welding, chemical fasteners, and/or any other fastener(s). A longitudinal axis of the secondary valve seat 212 is substantially aligned and/or parallel (e.g., coaxial) with the longitudinal axis 238 of the valve 102.

The second flow control member 208 moves or slides within the cavity 220 of the first flow control member 206 relative to the secondary valve seat 212. More specifically, the second flow control member 208 is slidably coupled relative to the first flow control member 206. In some examples, the second flow control member 208 can move independently relative to the first flow control member 206 (e.g., along at least a portion of an actuator stroke length). In particular, the second flow control member 208 defines a secondary seating surface 254 (e.g., a metallic throttling surface) adjacent the first side 240 of the second flow control member 208 that moves relative to a throttling surface 256 of the secondary valve seat 212 to modulate fluid flow through the passageway 202. The second flow control member 208 shown in FIG. 2 includes an aperture 258 between the first and second sides 240 and 242 to receive a valve stem 260 that operatively couples the second flow control member 208 and the actuator 110. In the illustrated example, a fastener 262 (e.g., a bolt) couples the second flow control member 208 and the valve stem 260. In some examples, the aperture 258 of the second flow control member 208 is threaded and a portion of the valve stem 260 is threadably coupled to the second flow control member 208. In some examples, the valve stem 260 is coupled to the second flow control member 208 via a pin. The second flow control member 208 of the illustrated example also includes channels 264 extending between the first side 240 and the second side 242 to pressure-balance the second flow control member 208 during operation of the valve 102.

Figure 3:
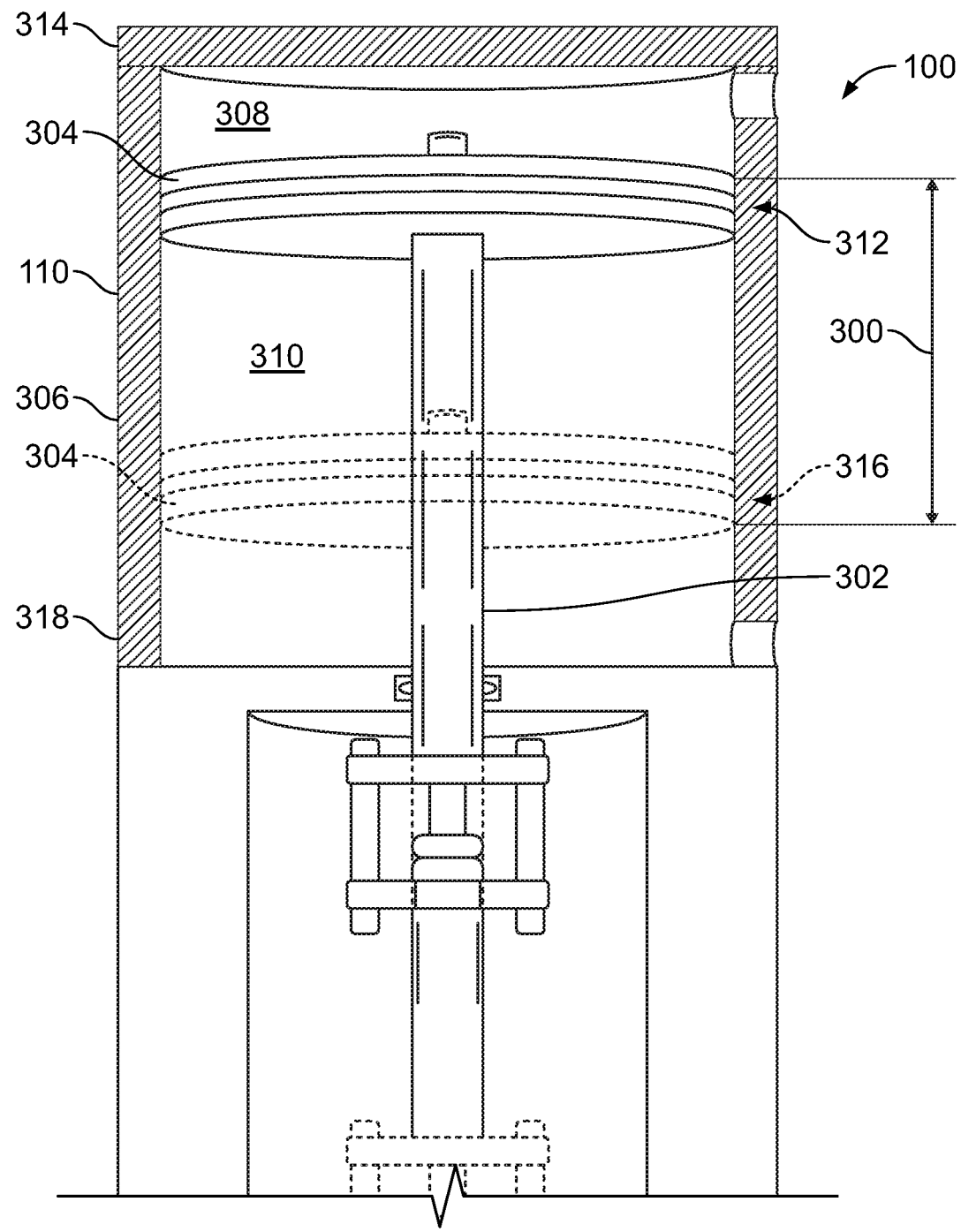
FIG. 3 illustrates a partial cross-sectional view of an example actuator of the example control valve assembly of FIGS. 1 and 2.

FIG. 3 is a partial cutaway view of the example actuator 110 of FIG. 1. To move the second flow control member 208 relative to the secondary valve seat 212 and/or relative to the first flow control member 206, the second flow control member 208 is operatively coupled to the actuator 110 via the valve stem 260. In the illustrated example, an actuator stem 302 couples the valve stem 260 (FIG. 2) to the actuator 110.

The actuator 110 of the illustrated example includes a sensing element 304 (e.g., a piston) disposed within a housing 306 of the actuator 110 to define a first chamber 308 and a second chamber 310. Specifically, the sensing element 304 moves along a full stroke travel length 300 between a first position 312 (e.g., a zero percent (0%) stroke length travel) adjacent a first end 314 of the housing 306 and a second position 316 (e.g., a 100 percent stroke length travel) adjacent a second end 318 of the housing 306 (e.g., shown in dashed line in FIG. 3). For example, the valve 102 is in a closed position to prevent or restrict fluid flow through the passageway 202 between the inlet 104 and the outlet 106 when the sensing element 304 is in the first position 312. The valve 102 is in a fully open or maximum flow position to allow fluid flow through the passageway 202 between the inlet 104 and the outlet 106 when the sensing element 304 is in the second position 316 as shown in dashed lines in FIG. 3. For example, the sensing element 304 moves to the first position 312 when the second chamber 310 receives a control fluid having a pressure that is greater than a pressure (e.g., atmospheric pressure) of a control fluid in the first chamber 308. In turn, the sensing element 304 of the actuator 110 via an actuator stem 302 causes the valve stem 260 to move away from the outlet 106 of the passageway 202, which causes the second flow control member 208 to move toward the secondary valve seat 212. Similarly, the sensing element 304 moves to the second position 316 in a direction toward the second chamber 310 and away from the first chamber 308 when the first chamber 308 receives a control fluid having a pressure that is greater than a pressure (e.g., atmospheric pressure) of the second chamber 310. In turn, the sensing element 304 via the actuator stem 302 causes the valve stem 260 to move toward the outlet 106 of the passageway 202, which causes the second flow control member 208 to move away from the secondary valve seat 212. Thus, in the illustrated example, movement of the sensing element 304 between the first position 312 and the second position 316 defines a full stroke travel length of the actuator 110.

Figure 4:
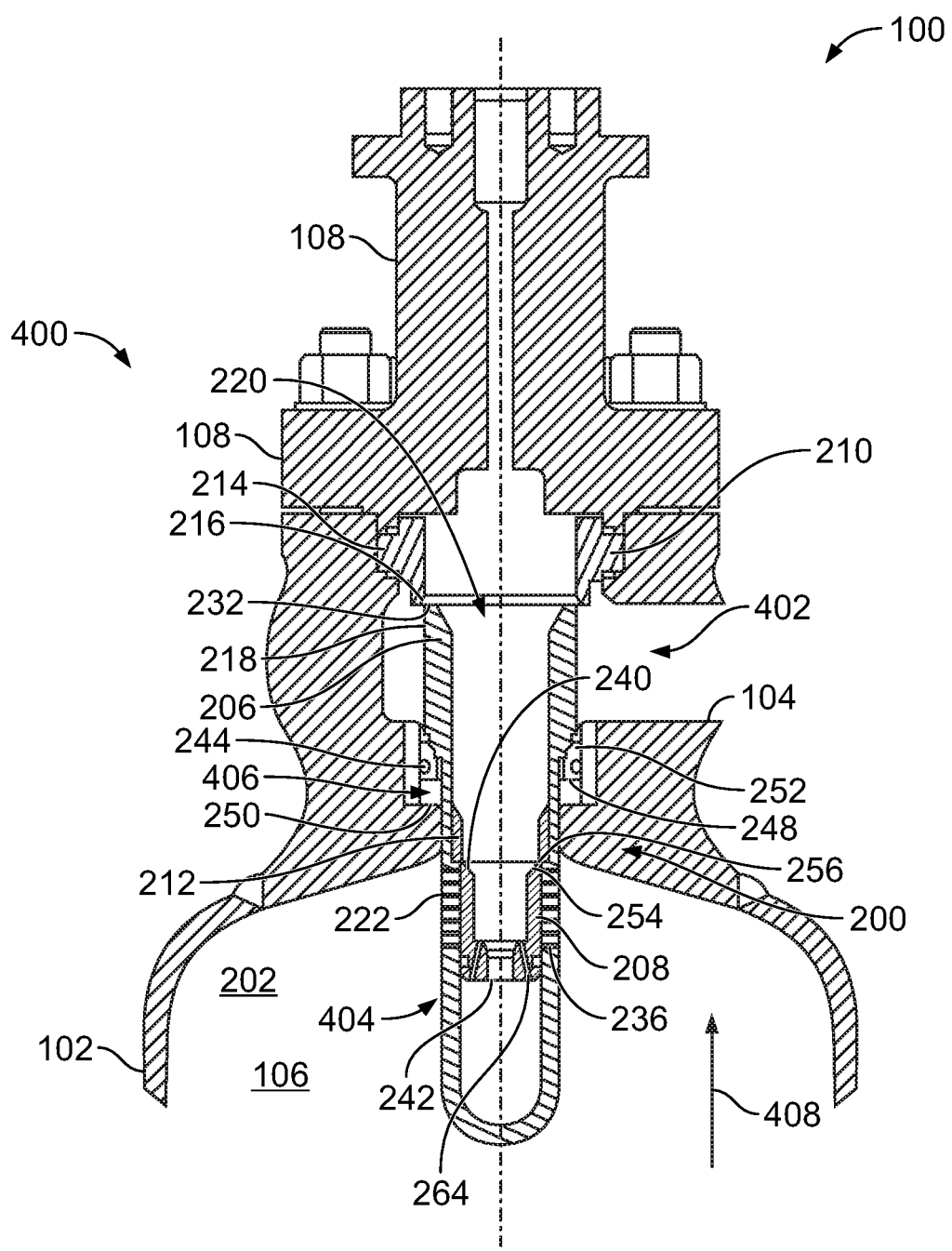
FIG. 4 is a partial view of the example control valve assembly of FIGS. 1-3 shown in a first state.

FIG. 4 is a partial view of the example control valve assembly 100 of FIGS. 1-3 shown in a first state or a fully closed position 400. More specifically, in the fully closed position 400, the sensing element 304 of the actuator 110 is in the first position 312 (FIG. 3), the first flow control member 206 is in a closed position 402, and the second flow control member 208 is in a closed position 404. In particular, in the fully closed position 400, the primary seating surface 232 of first flow control member 206 is sealingly engaged with the primary valve seat 210 and the secondary seating surface 254 of the second flow control member 208 is sealingly engaged with the throttling surface 256 of the secondary valve seat 212. In particular, the actuator 110 imparts a closing force or a seat load to the seating surface 232 of the first flow control member 206 and/or the secondary seating surface 254 of the second flow control member 208. Thus, the first flow control member 206 and the primary valve seat 210 of the illustrated example provide a substantially tight seal to prevent fluid flow between the inlet 104 and the outlet 106. In other words, when the seating surface 232 of the first flow control member 206 is sealingly engaged with the primary valve seat 210, fluid flow between the inlet 104 and the cavity 220 of the first flow control member 206 (i.e., the inlet side of the secondary valve seat 212) is restricted or prevented. Thus, the outer surface 222 of the first flow control member 206 adjacent the first end 226 and the primary valve seat 210 provide a wall to prevent fluid flow from the inlet 104 to the cavity 220. In the closed position 402, the shoulder 248 of the first flow control member 206 is spaced from the shoulder 250 of the valve body 204 to define a gap 406 therebetween.

The actuator 110, with the sensing element 304 in the first position 312, provides a closing force 408 (e.g., an upward force in the orientation of FIG. 4) via the valve stem 260 to retain the second flow control member 208 in a sealing engagement with the secondary valve seat 212. In turn, the closing force 408 is applied to the first flow control member 206 as a result of the secondary valve seat 212 being coupled (e.g., rigidly coupled) to the first flow control member 206. In other words, the closing force 408 imparted to the secondary valve seat 212 causes the primary seating surface 232 of the first flow control member 206 to seal against (e.g., sealingly engaged with) the primary sealing surface 216 of the primary valve seat 210 to provide a relatively tight shut-off. Thus, when the sensing element 304 is in the first position 312 (FIG. 3), a pulling force in a direction away from the outlet 106 of the passageway 202 in the orientation of FIG. 4 is imparted to the first flow control member 206 via engagement of the second flow control member 208 and the secondary valve seat 212.

Figure 5:
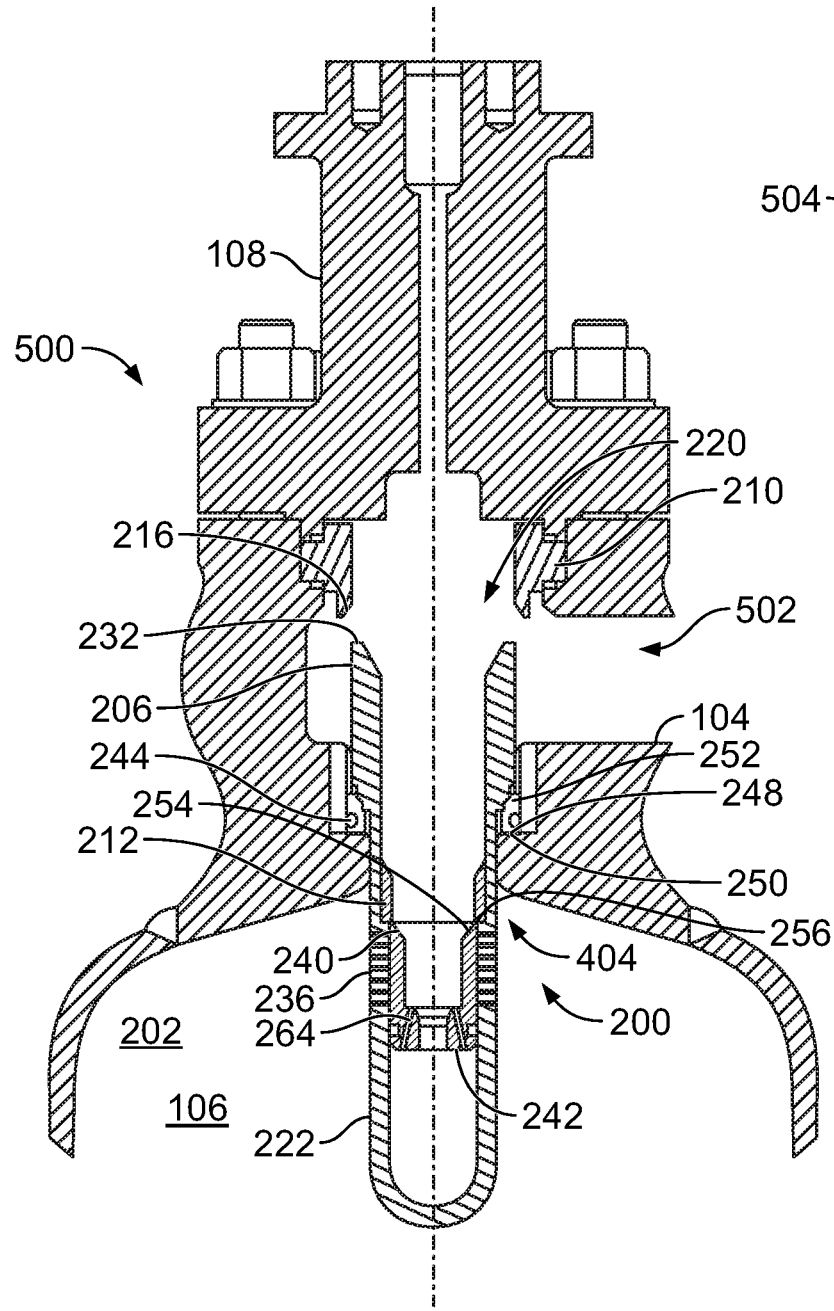
FIG. 5 is a partial view of the example control valve assembly of FIGS. 1-4 shown in a second state.

FIG. 5 is a partial view of the example control valve assembly 100 of FIGS. 1-3 shown in a second state or an intermediate position 500 (e.g., a partially open position). In the intermediate position 500, the first flow control member 206 moves away from the primary valve seat 210 to an open position 502. As the first flow control member 206 moves away from the primary valve seat 210, the gap 406 (FIG. 4) between the shoulder 248 of the first flow control member 206 and the shoulder 250 of the valve body 204 is reduced and/or eliminated. In the open position 502, the primary seating surface 232 of the first flow control member 206 is spaced from the primary sealing surface 216 of the primary valve seat 210 providing a flow path to enable fluid flow between the inlet 104 and the cavity 220 of the first flow control member 206. In other words, fluid is permitted to flow to the secondary valve seat 212 and the second flow control member 208. However, in the intermediate position 500, the second flow control member 208 is in the closed position 404 (e.g., sealingly engaged with the secondary valve seat 212) to prevent fluid flow between the inlet 104 and the outlet 106.

To move the first flow control member 206 away from the primary valve seat 210 to the open position 502, a control fluid is provided in the first chamber 308 (FIG. 3) of the actuator 110. This control fluid has a pressure that is greater than a pressure of a control fluid in the second chamber 310 to cause the sensing element 304 to move toward the second position 316. In turn, as the sensing element 304 moves toward the second position 316, the valve stem 260 and the second flow control member 208 move toward the outlet 106 of the passageway 202. As the second flow control member 208 moves toward the outlet 106, a closing force provided to the first flow control member 206 via the second flow control member 208 as noted above is reduced. Thus, when the sensing element 304 moves between the first position 312 and the second position 316, a pressure of the process fluid at the inlet 104 influences and/or affects a position of the first flow control member 206 given the reduced closing force and because the first flow control member 206 slides freely relative to the second flow control member 208. Thus, a pressurized fluid at the inlet 104 acting on the first flow control member 206 causes the first flow control member 206 to move toward the outlet 106 of the passageway 202 (e.g., a downward direction in the orientation of FIG. 5) as the second flow control member 208 moves toward the outlet 106.

As the second flow control member 208 attempts to move away from the secondary valve seat 212 when the sensing element 304 moves toward the second position 316, the pressurized fluid at the inlet 104 imparts a force to the first flow control member 206 to cause the first flow control member 206 to move or slide toward the second flow control member 208, thereby causing the secondary valve seat 212 to remain engaged with the second flow control member 208. In other words, the second flow control member 208 remains engaged with the secondary valve seat 212 as the first flow control member 206 moves between the closed position 402 and the open position 502 shown in FIG. 5 because the second flow control member 208 is positioned between a first force (e.g., a pulling force) imparted by the actuator 110 to the second side 242 of the second flow control member 208 in a direction toward the primary valve seat 210 (e.g., an upward direction in the orientation of FIG. 5) and a second force imparted by the process fluid at the inlet 104 to the first flow control member 206 in a direction toward the outlet 106 (e.g., a downward direction in the orientation of FIG. 5). Therefore, the second flow control member 208 remains sealingly engaged with the secondary valve seat 212 along a portion of the stroke length 300 of the actuator 110 as the first flow control member 206 moves between the closed position 402 and the open position 502. In the illustrated example, the first flow control member 206 moves toward the outlet 106 until the shoulder 248 of the first flow control member 206 and/or the retainer 252 engages the shoulder 250 of the valve body 204.

Further, as the first flow control member 206 moves to the open position 502, an opening is provided between the primary seating surface 232 and the primary sealing surface 216 to enable the process fluid at the inlet 104 to flow into the cavity 220 of the first flow control member 206 and toward the second flow control member 208. However, because the second flow control member 208 restricts or inhibits fluid flow through the valve 102 while the secondary seating surface 254 is sealingly engaged with the throttling surface 256 the secondary valve seat 212, a high pressure fluid at the inlet 104 flows across the primary seating surface 232 of the first flow control member 206 and/or the primary sealing surface 216 of the primary valve seat 210 without a significant pressure drop or differential. In other words, the pressure differential across the primary seating surface 232 of the first flow control member 206 and/or the primary sealing surface 216 of the primary valve seat 210 is relatively small or negligible as the first flow control member 206 opens or moves away from the primary sealing surface 216. Reducing or minimizing a pressure drop or differential across the primary seating surface 232 and/or primary sealing surface 216 significantly increases the operating life of the primary sealing surface 216 and/or the primary seating surface 232 and, thus, the valve trim apparatus 200.

Additionally, when the process fluid is in the cavity 220 of the first flow control member 206, the pressurized fluid at the inlet 104 flows through the channels 264 of the second flow control member 208 to pressure balance the second flow control member 208. Thus, as the first flow control member 206 moves to the open position 502, a pressure differential across the second flow control member equalizes and/or reduces prior to the second flow control member 208 moving an open position away from the secondary valve seat 212 to enable a substantial reduction of breakout force required.

Figure 6:
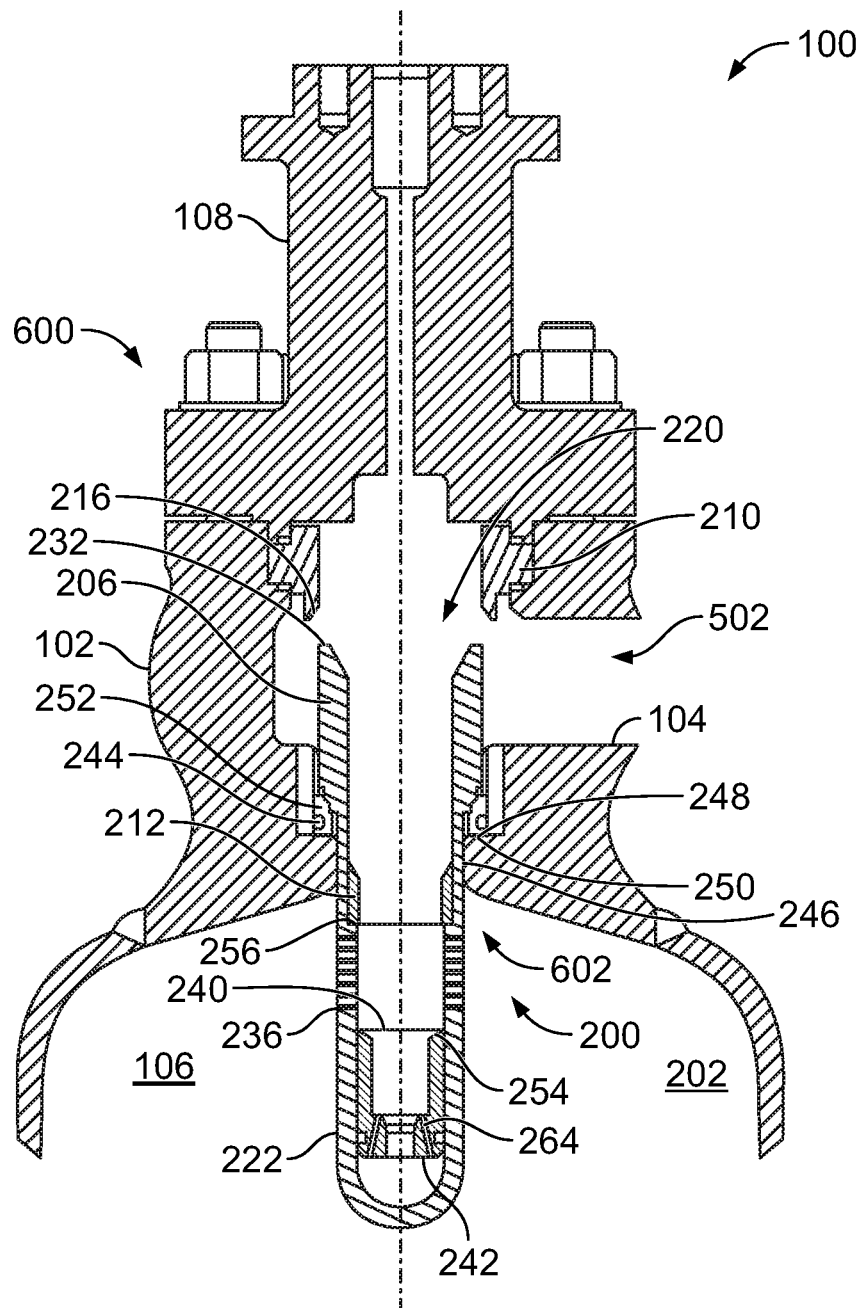
FIG. 6 is a partial view of the example control valve assembly of FIGS. 1-5 shown in a third state.

FIG. 6 is a partial view of the example control valve assembly 100 of FIGS. 1-5 shown in a third state or an open position 600 (e.g., a fully open position). In the open position 600, the first flow control member 206 is in the open position 502 and the second flow control member 208 is in an open position 602 to enable fluid at the inlet 104 to flow to the outlet 106 through the passageway 202. Specifically, at the open position 600, the first flow control member 206 is spaced from the primary valve seat 210 and the second flow control member 208 is spaced from the secondary valve seat 212 to enable (e.g., a maximum) fluid flow through the passageway 202 of the valve body 204 between the inlet 104 and the outlet 106. As noted above, the second flow control member 208 moves independently relative to the first flow control member 206 along at least a portion of the stroke length of the actuator 110 as the sensing element 304 moves between the first position 312 and the second position 316.

To move the second flow control member 208 to the open position 602, pressurized fluid continues to be applied in the first chamber 308 of the actuator 110 and the pressurized fluid in the second chamber 310 is further reduced or evacuated. As the sensing element 304 moves toward the second position 316, the valve stem 260 causes the second flow control member 208 to move further toward the outlet 106 of the passageway 202. However, with the first flow control member 206 engaged with the valve body 204, the first flow control member 206 cannot move further towards the outlet 106. Thus, the second flow control member 208 moves away from the secondary valve seat 212 to the open position 602. As the second flow control member 208 moves away from the secondary valve seat 212 between the closed position 404 of FIGS. 2, 4 and 5 and the fully open position 602 of FIG. 6, fluid from the inlet 104 that flows through the passageway 202 undergoes a pressure drop across the secondary valve seat 212, thereby causing an increase of velocity of the fluid flow. With the second flow control member 208 in the open position 602, the high velocity fluid flow from the inlet 104 is directed through the apertures 236 at the second end 230 of the first flow control member 206. More specifically, the high velocity fluid flow is sprayed and jetted through the apertures 236, thereby reducing the velocity of the process fluid between the inlet 104 and the outlet 106. As a result, the apertures 236 attenuate and/or abate noise that would otherwise be produced as the process fluid flows through the passageway 202. Additionally, while the first flow control member 206 is in the open position 502, the second flow control member 208 may be positioned or moved relative to the secondary valve seat 212 via the actuator 110 to throttle the fluid flow through the passageway 202 between the inlet 104 and the outlet 106. For example, the actuator 110 may be stroked between the first position 312 and the second position 316 to throttle the fluid flow through the passageway 202.

Thus, the valve trim apparatus 200 enables a push-to-open control valve configuration. As a result, the control valve assembly 100 can be moved to an open position without requiring a full stroke length of the actuator 110. For example, the first flow control member 206 and the second flow control member 208 can be positioned to the respective open positions 402 and 602 without having to completely stroke the sensing element 304 from the first position 312 to the second position 316. For example, the first flow control member 206 can move to the open position 602 prior the sensing element 304 moving to the second position 316. Furthermore, the second flow control member 208 may move to the open position 602 prior to the sensing element 304 moving the second position 316. In the open position 602 shown in FIG. 6, the second flow control member 208 may be moved further toward the outlet 106 to a fully open position to expose the process fluid to additional apertures 236 when the sensing element 304 moves to the second position 316.

Further, because the first flow control member 206 extends between both sides of the opening 246 (FIG. 2), the full stroke length 300 of the actuator 110 to open the first and second flow control members 206 and 208 may be less than a stroke length needed to open the first and/or second flow control members 206 and 208 if the first flow control member 206 and the second flow control member 208 were only positioned on one side (e.g., the outlet side 106) of the opening 246. Furthermore, because the primary sealing surface 216 is hung or suspended in the fluid flow passageway 202, as shorter stroke length is required to move the first and/or second flow control members 206 and 208 between the open 502 and 602 and closed positions 402 and 404. Thus, a valve trim apparatus having a relatively smaller dimensional footprint may be employed with valves configured as push-to-open, flow down valves.

Due to the angle of the valve body 204, angle-style valves advantageously allow for easy draining because the valve body or flow path of such valves does not have any pockets or areas that allow accumulation of fluid and/or residue. Thus, angle-style control valves are typically used in the chemical and petroleum industries, which often require control of residual oils or other liquids with coking properties. However, the example valve trim apparatus 200 described herein are not limited to use with angle-style fluid valves. In other examples, fluid valves such as, for example, globe valves, rotary valves, linear valves, etc., may be employed.

Although certain apparatus have been described herein, the scope of coverage of this patent is not limited thereto. To the contrary, this patent covers all apparatus fairly falling within the scope of the appended claims either literally or under the doctrine of equivalents.

What is claimed is:

1. A fluid valve comprising:
   a primary valve seat;
   a first flow control member having a cavity and a first seating surface, the first flow control member movable relative to the primary valve seat to control fluid flow between an inlet and an outlet of the fluid valve when the valve trim apparatus is positioned in the fluid valve;
   a second flow control member disposed within the cavity, the second flow control member being slidably coupled relative to the first flow control member; and
   a secondary valve seat coupled to the first flow control member, the second flow control member to move relative to the secondary valve seat to throttle a fluid flow across the secondary valve seat, the second flow control member is structured to move away from the secondary valve seat only after the first flow control member is in open position relative to the primary valve seat.

2. The fluid valve as defined in claim 1, wherein the secondary valve seat is disposed within the cavity of the first flow control member.

3. The fluid valve as defined in claim 2, wherein the secondary valve seat is threadably coupled to an inner surface of the cavity of the first flow control member.

4. The fluid valve as defined in claim 1, wherein the first flow control member includes a body having a first end defining the first seating surface and a second end opposite the first end having a noise attenuator.

5. The fluid valve as defined in claim 4, wherein the noise attenuator includes a plurality of apertures.

6. The valve trim apparatus as defined in claim 1, wherein the cavity of the first flow control member is to receive process fluid from the inlet of the fluid valve.

7. The fluid valve as defined in claim 1, wherein the first flow control member includes a U-shaped profile.

8. The fluid valve as defined in claim 1, wherein the first flow control member and the second flow control member are coaxially aligned.

9. The fluid valve defined in claim 1, wherein the primary valve seat and the secondary valve seat are coaxially aligned.

10. The fluid valve as defined in claim 1, wherein the second flow control member moves independently relative to the first flow control member.

11. The fluid valve as defined in claim 1, wherein a force imparted to the second flow control member is to cause the second flow control member to sealingly engage the secondary valve seat to cause the first flow control member to sealingly engage the primary valve seat.

12. The fluid valve as defined in claim 1, wherein the second flow control member is to impart a closing force to the first flow control member to cause the first flow control member to sealingly engage the primary valve seat via engagement of the second flow control member and the secondary valve seat.

13. The fluid valve as defined in claim 12, further including an actuator coupled to the second flow control member via a stem, the actuator to impart the closing force to the second flow control member via the stem to cause the second flow control member to sealingly engage the secondary valve seat, the closing force being imparted to the first flow control member via engagement between the second flow control member and the secondary valve seat.

14. A fluid valve comprising:
a primary valve seat;
a first flow control member having a cavity and a first seating surface, the first seating surface movable relative to the primary valve seat;
a secondary valve seat positioned within the cavity of the first flow control member; and
a second flow control member positioned within the cavity of the first flow control member, the second flow control member being slidably coupled to the first flow control member, the second flow control member having a second seating surface, the second seating surface of the second flow control member to engage the secondary valve seat to restrict fluid flow across the secondary valve seat, the second sealing surface to move relative to the secondary valve seat to throttle fluid flow across the secondary valve seat, the second flow control member is to move away from the secondary valve seat when the first flow control member is in an open position relative to the primary valve seat.

15. The fluid valve as defined in claim 14, further including an actuator coupled to the second flow control member via a stem, the actuator to impart a closing force to the second flow control member via the stem to cause the second flow control member to sealingly engage the secondary valve seat, the second flow control member to cause the first flow control member to seal against the primary valve seat via engagement of the second flow control member and the secondary valve seat.

16. The fluid valve as defined in claim 14, wherein the first flow control member moves together with the second flow control member along at least a first portion of a stroke length of an actuator, and wherein the second flow control member moves independently relative to the first flow control member along at least a second portion of the stroke length of the actuator.

17. The fluid valve as defined in claim 14, wherein the second flow control member is to move away from the secondary valve seat only after the first flow control member is in the open position relative to the primary valve seat.

18. The fluid valve as defined in claim 14, wherein the primary valve seat structured to be suspended within a fluid flow passageway of a valve body.

19. The fluid valve as defined in claim 14, wherein the first seating surface is to move relative to the primary valve seat to provide shut-off control and restrict fluid flow through the fluid flow passageway.

20. A fluid valve comprising:
first means for providing a first sealing surface to be positioned within a passageway of a valve body between an inlet and an outlet when the valve trim apparatus is positioned in the fluid valve;
first means for controlling fluid flow through the passageway of the valve body between the inlet and the outlet, the first means for controlling fluid flow defining means for seating for providing a fluid flow shut-off to restrict flow through the passageway;
second means for providing a second sealing surface disposed in a cavity defined by the first means for controlling fluid flow; and
second means for controlling fluid flow through the passageway, the second means for controlling fluid flow positioned in the cavity of the first means for controlling, the second means for controlling fluid flow slidably coupled to the first means for controlling fluid flow to throttle a fluid to flow through the passageway of the valve body, the second means for controlling to move along the cavity of the first means for controlling between a first position to restrict fluid flow through the passageway and a second position to allow fluid flow through the passageway, wherein the second means for controlling fluid flow is to move to an open position only after the first means for controlling fluid flow moves away from the means for defining the first sealing surface.

21. The fluid valve as defined in claim 20, further including means for actuating coupled to the second means for controlling fluid flow, the means for actuating to impart a force to the second means for controlling fluid flow to cause the second means for controlling fluid flow to sealingly engage the means for defining the second sealing surface, the second means for controlling fluid flow to cause the first means for controlling fluid flow to seal against the means for defining the first sealing surface via engagement of the second means for controlling fluid flow and the means for defining the second sealing surface.

* * * * *